Patented Apr. 19, 1927.

1,625,415

UNITED STATES PATENT OFFICE.

LEON LILIENFELD, OF VIENNA, AUSTRIA.

FLUORESCENT OIL AND PROCESS OF MAKING SAME.

No Drawing. Application filed July 23, 1924, Serial No. 727,810. Renewed December 30, 1926.

It is known that the technically valuable coumarone resins are obtained from non-purified aromatic hydrocarbon mixtures, for instance, from crude benzol or the so-called solvent naphtha or the like, by treating them with sulphuric acid. This is commonly effected by subjecting the aromatic hydrocarbon mixtures, such as crude benzol, solvent naphtha and the like, which have been treated with sulphuric acid and subsequently washed to substantial neutrality, to distillation, the coumarone resins being obtained as a residue.

I have now found that if aromatic hydrocarbon mixtures, for instance, solvent naphtha, crude benzol or the like, or their high boiling constituents, which have been treated with a polymerizing agent, such as sulphuric acid and washed to substantial neutrality, are freed from such constituents, as would boil at temperatures up to 180° C. at atmospheric pressure, and the residue is distilled in vacuo, say for example under a vacuum of about 35 m. m. of mercury (preferably avoiding overheating) an oil is obtained which passes over in vacuo between say 150° and 300° C. Thus, for instance, under a vacuum the following fractions distill over: between 90 and 130° C., naphthalene and the naphthalene oils, between 130 and 180° C., slightly viscous condensation products, and between 180 and 300° C., the viscous oily bodies of high boiling point claimed in this application.

The oil forming the last mentioned fraction, may be purified by being redistilled (in vacuo, preferably) and is obtained as a water-white to light yellow, viscous, fluorescent oil which consists almost completely, or completely, of saturated hydrocarbons of the aromatic series.

The yield may amount to approximately 6 to 15% (based on the amount of crude benzol or solvent naphtha used), according to the quality of the starting material. The oil is adapted for use as a lubricating oil, as an addition to insulating and cable covering material, as a transformer oil and as an addition to and as a colloiding or softening agent for various plastic materials including cellulose ether plastics and for pharmaceutical purposes.

While I have referred to the use of sulphuric acid as the polymerizing agent (this being the one most commonly used in effecting the polymerizing of the coumarone) it will be understood that other polymerizing agents, such as those well known in the coumarone resin art, can be employed with like effect.

The use of these oils in making cellulose ether plastics is claimed in my copending U. S. patent application Serial No. 80,357, filed Jan. 9, 1926.

The oils produced in accordance with this process consist almost entirely of saturated hydrocarbons of the aromatic series, boiling between about 180 and about 300° C., under a vacuum of 35 m. m. of mercury; their specific gravity is about 1.15 to 1.25 at 15° C., they are water-white to light yellow oils showing a strong blue fluorescence, they have a slight odor of aromatic hydrocarbons, their viscosity at 20° C., is 43 to 48 Engler degrees and their viscosity at 50° C., is about 3.5 to 4.2 Engler degrees. Their molecular weight equivalent, determined by the freezing and boiling point in phenol as a solvent, is about 261 to 272.

These oils are very soluble in liquid aliphatic and aromatic hydrocarbons, phenol, nitrobenzene, chlor-benzene, chloroform carbon tetrachloride, carbon bisulphide, acetone, amyl alcohol and ethyl acetate. They are also somewhat soluble in methyl alcohol and are more readily soluble in ethyl alcohol and glacial acetic acid.

The oils of the present case are somewhat different from the oils of my prior U. S. Patents Number 1,563,203 and 1,563,204, in regard to the fluorescence. The oils of said prior patents show a very strong and very conspicuous blue fluorescence, which is conspicuous to every observer, whereas the oils of the present case are but slightly fluorescent, so that the blue fluorescence thereof may not be noticed upon a very casual inspection of the oil. As compared with the oils of said prior patents, it is stated that the oils used in the present case have considerably more plasticizing effect than the oils of said prior patents, when using the two oils with cellulose ethers in the same proportions. The quantity of oil to be used in the present case, to give approximately the same plasticizing effect, will be about two-thirds of the quantity used in the said prior patents. The products of the present case are also rather more resistant against light and air, than the oils of the said prior patents. The oils of the present case are almost entirely saturated hydrocarbons of the aromatic series, whereas the oils of the said prior patents contain considerable quantities of unsaturated hydrocarbons.

I am aware that in the production of coumarone resin, solvent naphtha and similar liquids have been treated with a small amount of sulphuric acid as a polymerizing agent, the sludge removed and the oil washed neutral with water or washed with dilute alkaline solution and water, the liquid then being distilled to recover and collect the solvent naphtha, say up to a temperature of 180° C. This leaves a soft resinous mass, which is thereafter hardened by distillation sometimes in vacuo, but the temperature of the vacuum distillation is kept below the temperature at which any substantial darkening of the resin would be produced, and of course below the temperature which would injure the properties of the resin product. This distillation is ordinarily effected at a pressure substantially below atmospheric, and in a current of steam or superheated steam.

In the present invention the first part of the process, up to the formation of the recovery of the purified benzol or solvent naphtha, and the production of the soft resinous mass, can be conducted as in the above described production of coumarone resin. The distillation of the soft resinous mass is carried on, under a vacuum (of say 35 m. m. of mercury) and is carried to a high temperature and the residue in the still is a black pitchy material of no value whatever for the ordinary uses of coumarone resin.

The object of the invention is to produce viscous fluorescent oils in the highest possible yields. The vacuum distillation is preferably also conducted without the use of steam.

The distillation is carried on preferably until the temperature of the material in the still passes 240° C., and preferably until the temperature reaches 300° C., although when the above stated degree of vacuum is employed the final temperature in the distilling vessel may be somewhat lower than 300° C., say 280° C. The oils which distil off under the stated degree of vacuum, up to 180° C., possess only a trifling viscosity and a high vapor tension, no fluorescence and are readily soluble in ethyl alcohol. Such oils would not be at all suitable for use in the production of plastics from cellulose ethers. These oils can be separately collected, either in the original cut, or in the redistillation operation, if desired. The cut can be made at 180° C., or at a somewhat higher temperature, if desired.

The total fraction of vacuum distilled from 180° C., up to 240° C., under the conditions mentioned, possesses some viscosity and fluorescence, and is rather suitable as a plasticizing agent in cellulosic ether plastics although not as good as when the temperature is carried to a substantially higher degree.

In the above description I have referred throughout to the employment of a vacuum of 35 m. m. (absolute pressure 760-35 m. m.=725 m. m. of mercury) for the purpose of comparison. However, I desire it to be understood that the invention is not in any way restricted to this degree of vacuum, but a lower degree or a much higher degree of vacuum can be used in carrying out the process, and the temperatures of the cut can be adjusted to the degree of vacuum employed.

Depending upon circumstances, the limits of the temperature in the final vacuum distilling operation, may vary. It is preferable to carry the temperature (measured by having the bulb of the thermometer in the liquid in the still) well above 240° C., and preferable up to 300° C., while maintaining a vacuum of about 35 m. m. of mercury. Even with this vacuum, the final temperature may be below 300° C. Thus the distillation can be stopped at 290, 280, 270, 260, 250 or even 240° C., but the products are successively less suitable.

In the preparation of coumarone resins it has, as above stated, been heretofore proposed to employ a current of steam (superheated if desired) with vacuum, to distill off lighter products, to leave the hard resins. However, I do not use steam in the vacuum distillation, as the oil products (i. e. the products I seek to produce) would greatly suffer.

Also in all cases, I carry the distillation in vacuo, to such a high temperature that the product left in the still is of no value for the ordinary uses of coumarone resin. It is dark, black or nearly black, is very brittle and has no strength or toughness. It could not be used to make a commercial varnish, viewed either from the standpoint of color or toughness.

The present application is a substitute for, and in part a continuation of my co-pending application No. 465,705, filed April 20, 1921.

I claim:—

1. A process of making oily bodies of high boiling points which comprises treating an aromatic hydrocarbon material containing polymerizable constituents with a polymerizing agent, removing the excess of polymerizing agent, freeing from fractions which boil at atmospheric pressure at 180° C., by distillation, and distilling the residue in vacuo, while carrying the temperature at least up to 240° C., condensing the vapors and collecting the condensate of such distillation.

2. A process of making oily bodies of high boiling points which comprises treating an aromatic hydrocarbon material containing polymerizable constituents with a polymerizing agent, removing the excess of polymerizing agent, freeing from fractions which boil at 180° C., by distillation and distilling the residue in vacuo up to substantially above 240° C., and collecting the condensate of such distillation, and redistilling the same.

3. A process of making oily bodies of high boiling points which comprises treating an aromatic hydrocarbon material containing polymerizable constituents with a polymerizing agent, removing the excess of polymerizing agent, freeing from fractions which boil at 180° C., by distillation, and distilling the residue in vacuo, up to temperatures at which the residue is converted into a substantially black pitchy material, and collecting the condensate of such distillation.

4. A process of making oily bodies of high boiling points which comprises treating an aromatic hydrocarbon material containing polymerizable constituents with a polymerizing agent, removing the excess of polymerizing agent, freeing from fractions which boil at 180° C., by distillation, and distilling the residue in vacuo, up to temperatures at which the coumarone resin is converted into a substantially black pitchy material, and collecting the condensate of such distillation, and redistilling the same.

5. A process of making oily bodies of high boiling points which comprises treating an aromatic hydrocarbon material containing polymerizable constituents with a polymerizing agent, removing the excess of polymerizing agent, freeing from fractions which boil at 180° C., by distillation, and distilling the residue in vacuo up to approximately 300° C., and collecting the condensation of such distillation.

6. A process for the production of high boiling oily bodies, which process consists in treating a crude aromatic hydrocarbon mixture with a polymerizing agent, freeing the remaining material from fractions which boil up to 180° C., at ordinary pressure, distilling the residue in vacuo, while running the temperature to substantially above 240° C., and collecting the fraction distilling over during this vacuum distillation step.

7. A process for the production of high boiling oily bodies, which process consists in treating solvent naphtha with a polymerizing agent, freeing the remaining material from fractions which boil up to 180° C., at ordinary pressure, distilling the residue in vacuo, while running the temperature to substantially above 240° C., and collecting the fraction distilling over during the vacuum distillation step.

8. A process for the production of high boiling oily bodies, which process consists in treating a crude aromatic hydrocarbon mixture with sulphuric acid, freeing the remaining material from fractions which boil up to 180° C., at ordinary pressure, distilling the residue in vacuo while running the temperature to substantially above 240° C., and collecting the fraction distilling over during the vacuum distillation step.

9. Process for the production of high boiling oily bodies, which process consists in treating solvent naphtha with sulphuric acid, removing the acid, freeing the remaining material from fractions which boil up to 180° C. at ordinary pressure, distilling the residue in vacuo while running the temperature to substantially above 240° C., and collecting the fraction distilling over the vacuum distillation step.

10. A process of making oily bodies of high boiling points which comprises treating an aromatic hydrocarbon material containing polymerizable constituents with a polymerizing agent, removing the excess of polymerizing agent, freeing from fractions which boil at 180° C., by distillation, and distilling the residue in vacuo, in the absence of added steam, up to temperatures at which the residue is converted into a substantially black pitchy material, and collecting the condensate of such distillation.

11. Process for the production of high boiling oily bodies, which process consists in treating solvent naphtha with sulphuric acid, removing the acid, freeing the remaining material from fractions which boil up to 180° C. at ordinary pressure, distilling the residue in vacuo while running the temperature up to approximately 300° C., and collecting the fraction distilling over during the vacuum distillation step.

12. A process which comprises distilling, in vacuo, soft resinous material including polymerized coumarone, while carrying the temperature up to substantially above 240° C., and collecting the distillate.

13. A process which comprises distilling, in vacuo, soft resinous material including polymerized coumarone, while carrying the temperature up to about 300° C., and collecting the distillate.

14. A process which comprises distilling, in vacuo, soft resinous material including polymerized coumarone, while carrying the temperature high enough to convert the distillation residue into a dark colored material of pitchy character, and collecting the distillate.

15. The herein described new oils, being highly viscous oils exhibiting a blue fluorescence, being somewhat heavier than water, distilling in vacuo between about 180 and 300° C., being miscible in all proportions with liquid aromatic and aliphatic hydrocarbons, and consisting essentially of soluble aromatic hydrocarbons.

16. As new products oily bodies of high boiling point, which have the properties of the oily bodies produced by treatment of crude aromatic hydrocarbon mixtures, with polymerizing agents, freeing them from fractions which boil at temperatures up to 180° C. at ordinary pressure, and distilling the residue in vacuo, such oils distilling in a vacuum of 35 m. m. pressure at between 180 and 300° C. being somewhat heavier than water, readily soluble in liquid aromatic and aliphatic hydrocarbons, and consisting essentially of saturated aromatic hydrocarbons, substantially as described.

In testimony whereof I affix my signature.

LEON LILIENFELD.